Dec. 8, 1953     W. VAN GUILDER     2,661,679
COMBINATION CAKE PAN AND SUPPORT
Filed April 12, 1949
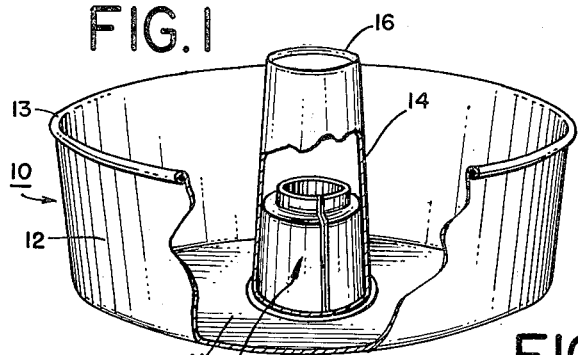
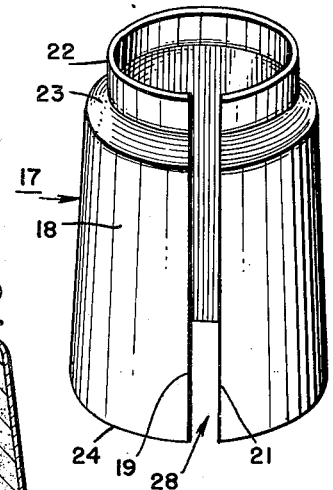
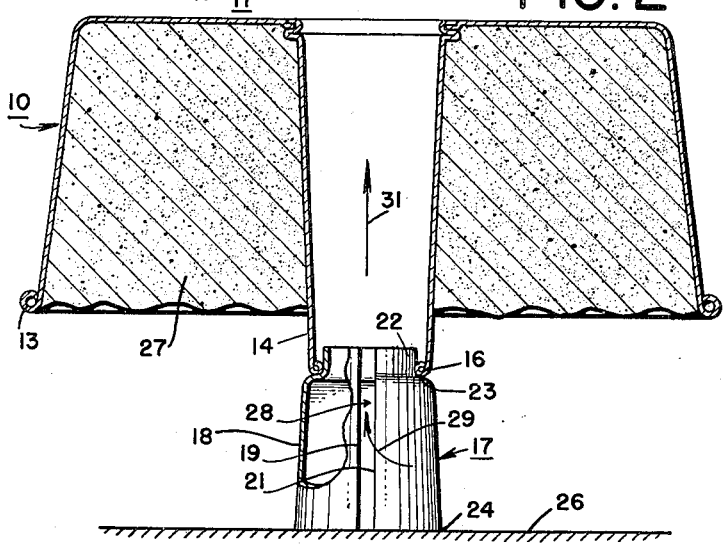
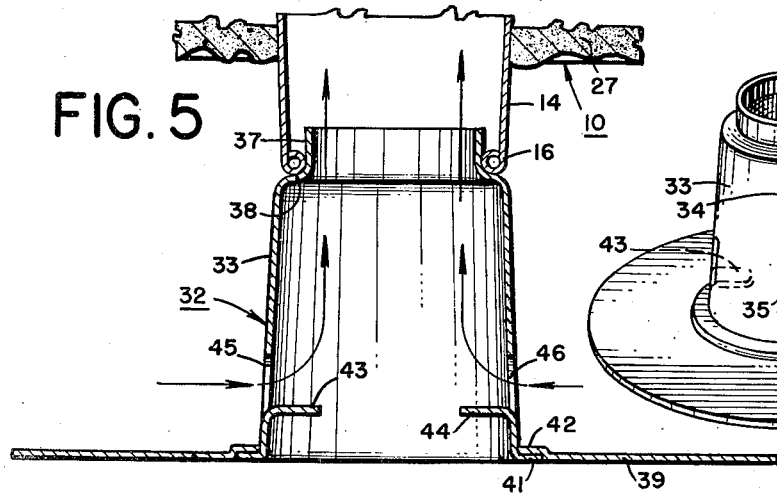
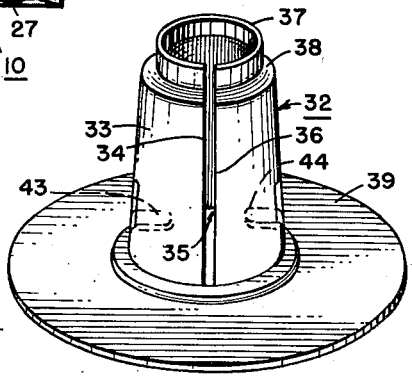
INVENTOR:-
WALTER VAN GUILDER
William C. Babcock
ATTORNEY Patented Dec. 8, 1953

2,661,679

UNITED STATES PATENT OFFICE 2,661,679

COMBINATION CAKE PAN AND SUPPORT

Walter Van Guilder, River Forest, Ill., assignor to General Mills, Inc., a corporation of Delaware Application April 12, 1949, Serial No. 87,035

10 Claims. (Cl. 99—428)

The present invention relates to an improved support for cake pans and more particularly to the combination of such a support with a cake pan of the tube type.

Cake pans of the tube type are well known and include a central tubular portion which leaves an opening at the center of the cake baked in such a pan. Tube cake pans are used primarily for sponge cakes, angel food cakes, and particularly the newer chiffon cakes. In some cases the central tube of these pans extends above the outer rim of the pan to facilitate the support of the pan in inverted position while the cake is cooling. Since the top of this tubular portion is relatively narrow, its use as a support leaves the inverted cake in a relatively unstable position. Furthermore, the tubes ordinarily fail to extend far enough above the remainder of the pan to provide adequate space beneath the inverted cake for circulation of air during cooling. It is therefore necessary to recommend the use of an inverted funnel or of a milk bottle as an auxiliary support for the inverted tube pan. One attempt to avoid the above-mentioned difficulties involves the use of a plurality of legs extending upwardly from the rim of the pan, these legs serving to support the pan in inverted position. The projecting legs, however, are easily damaged and interfere with ready storage of the cake pan as by stacking.

It is accordingly one object of the present invention to provide an improved cake pan support for tube pans.

It is a further object to provide in combination, a cake pan with a central tube, and a cake pan support removably mounted within the tube.

Still another object of the invention is an improved support for use with tube cake pans, the support being designed for storage inside the tube of the pan and also for operative use as an extension at one end of the tubular portion.

Other objects and advantages will be apparent from the following specification, in which certain preferred embodiments of the invention are shown.

In the drawings which accompany this specification, and in which like reference characters indicate like parts, Fig. 1 is a perspective view of a cake pan and support according to the present invention, with certain portions of the drawing broken away for clearness.

Fig. 2 is a sectional view of the cake pan and support of Fig. 1, but with the cake pan in inverted operative position on the support.

Fig. 3 is a perspective view of the support of Figs. 1 and 2.

Fig. 4 is a similar perspective view of an alternate embodiment of the invention, and Fig. 5 is a partial sectional view of a tube cake pan inverted on the support of Fig. 4.

As shown in Fig. 1, the invention is used in combination with a tube cake pan 10. This pan includes a flat circular or annular bottom portion 11, a cylindrical or slightly conical outer wall 12 having a beaded upper edge 13, and a central tubular portion 14 having an internally beaded upper edge 16. In the particular form shown in the figure, the cross section of the central tubular portion 14 gradually decreases from the bottom toward the top of the pan. Furthermore, the upper end 16 of the tubular portion projects a substantial distance above the upper rim 13 of the outer wall of the cake pan.

In accordance with the invention, an improved cake pan support, designated generally as 17, is provided. As shown in Fig. 3, this support includes a main body portion 18, which in this particular example, is of substantially cylindrical or slightly conical form. The body portion is made of resilient sheet material bent into the illustrated tubular shape with the longitudinal edges 19 and 21 of the body portion spaced slightly apart as shown at 28.

At its upper end, the main body portion 18 is provided with an extension 22 of reduced diameter. A lateral or transverse shoulder 23 is thus formed between the reduced extension 22 and the remainder of the body portion 18.

In this case the shape of the main body portion is substantially similar to the shape of the lower portion of cake pan tube 14. The dimensions of the support body 18 are such that the support can be telescoped endwise into the lower open end of the cake pan tube. When support body 18 is in its normal or unstressed condition, its external cross sectional dimensions are just slightly greater than the corresponding internal cross section dimensions at the lower end of the cake pan tube. Thus as the support is pushed into the lower end of the tube, the body portion 18 will be compressed slightly and its surfaces will engage resiliently against the interior of the cake pan tube to maintain the support in the storage position shown in Fig. 1.

When a cake is to be baked, the support 17 can be readily withdrawn from the storage position of Fig. 1 by insertion of a finger through the lower end of the cake pan tube and support. The cake is baked in the pan, with the pan in normal upright position. When the baking operation is complete, the support 17 is placed with its flat circular lower edge 24 on a table top 26 and the cake pan is then inverted so that the upper rim 16 of the cake pan tube is forced over the reduced extension 22 and against the shoulder 23 to support the tube pan in inverted position.

The normal or unstressed cross sectional dimension of the reduced extension 22 may be slightly greater than the internal cross section of the tube rim 16, in order to obtain resilient interengagement of the parts, tending to increase the stability of the inverted pan. The pan 10 is accordingly supported in inverted position with the cake 27 spaced sufficiently above the table surface 26 for proper cooling. Air may also circulate freely through the interior of the cake pan tube by passage through the longitudinal slot 28 of the support 17 as indicated by arrows 29 and 31.

In Figs. 4 and 5, another embodiment of the invention has been shown. The support 32 of Fig. 4 includes a main body portion 33 which is substantially similar to the main body portion 18 of Figs. 1–3. Thus the body portion is formed of resilient sheet material bent into tubular form with its longitudinal edges 34 and 36 spaced to provide a longitudinal slot 35. The upper end of the body portion 33 includes a reduced extension 37 and supporting shoulder 38 just as in the previous case.

To increase the stability of the support, an annular extending flange or base 39 is provided at the bottom of the body portion. In order to mount the base 39 on the body portion, the body portion has a laterally extending flange 41 at its lower end. An offset annular flange 42 on the inner periphery of the flat base plate 39 is fastened to flange 41 by spot welding, soldering, or in any other desired manner. When the support 32 is pushed into the lower end of a cake pan tube, as in the case of support 17 of Fig. 1, the base plate 39 will, of course, lie closely against the bottom of the cake pan and will not interfere with proper storage or stacking of the pan.

To facilitate the removal of the support 32 from its storage position, the support is provided with a handle which is easily accessible for manual withdrawal. In this case, the handle includes one or more internally extending lugs 43 and 44 which are struck inwardly from the sides of the main body portion 33. These internal extensions are provided at the end of the support near the base plate 39 where they are readily accessible to the fingers of the user.

In Fig. 5, the use of this support to maintain a cake pan in inverted position is illustrated. The operation is substantially the same as that described in connection with Fig. 2 except that the presence of the base plate 39 adds to the stability of the support. Circulation of air through the interior of the cake pan tube may take place in this case not only through the slot 35 of the support, but also through the openings 45 and 46 formed when the handle portions 43 and 44 were deformed inwardly. The upper end of the cake pan tube 16 is resiliently engaged by the reduced extension 37 and is supported by the shoulder 38 to maintain the cake 27 the desired distance above the base 39 and the table or other support located beneath the base.

According to the foregoing specification an improved cake pan support, and a combination of such a support with a tube cake pan, have been described as illustrative of the invention. The use of such a support in combination with a tube cake pan accomplishes the objects set forth at the beginning of the specification and avoids the major disadvantages of the prior constructions described. The combination of the present invention can be used not only with tube pans in which the tube extends beyond the rim of the pan as in the present drawings, but also with other pans in which the upper end of the tube is at the same level as the outer rim of the pan. Similarly, various modifications and changes in the exact form of the support, and in the means for engagement of the support with the tube to maintain the support in storage position and in operative position respectively will be readily apparent to persons skilled in the art. It is accordingly intended that the present invention include all such modifications and improvements as fall within the spirit and scope of the attached claims.

Now, therefore, I claim:

1. In combination, a cake pan having a central tube with an upper end, and a cake pan support selectively and removably mounted in a storage position within the tube, the support having means engaging the tube and normally retaining the support in storage position when the pan is moved, and the support also having a shouldered portion on which the upper tube end may be selectively mounted to hold the pan and tube in inverted position above the support when the latter is withdrawn from said storage position.

2. In combination, a cake pan having a central tube with a narrow cross section at its upper end and a relatively wider cross section at its lower end, and a cake pan support selectively and removably mounted in a storage position within the lower end of the tube, the support having means engaging the tube and normally retaining the support in storage position when the pan is moved, and the support also having a portion for interfitting engagement with the upper end of the tube to hold the tube and pan selectively in inverted position above the support when the latter is withdrawn from said storage position.

3. In combination, a cake pan having a central tube, and a cake pan support having means selectively engaging the tube and holding the support in a storage position substantially within the tube, the support also having means selectively engaging an end of the tube and holding the support in an operative position extending axially beyond the end of the tube when the support is withdrawn from its storage position.

4. In combination, a cake pan having a central tube, and a cake pan support having means selectively and resiliently engaging the tube and holding the support in a storage position substantially within the tube when the pan is moved, the support also having a reduced extension at one end providing a shoulder selectively engaging one end of the tube and holding the support in an operative position extending beyond the end of the tube.

5. In combination, a cake pan having a central tube of decreasing cross section from its lower to its upper end, and a cake pan support having a resiliently deformable body portion of decreasing cross section from its lower to its upper end and fitting within the lower end of the tube in a selective storage position, the support having means engaging the tube and normally retaining the support in storage position when the pan is moved, and the support also having a shoulder at its upper end selectively engaging the upper end of the central tube and supporting the tube and pan in inverted operative position above the support when the latter is withdrawn from said storage position, and a portion of the support above said shoulder extending into the tube end and resiliently engaging the tube to retain the pan and support in said operative position.

6. In combination, a cake pan having a central tube with open upper and lower ends, and a cake pan support having a body portion selectively and removably mounted in a storage position within the tube, the body portion having a resiliently compressible section engaging the inner wall of the tube and frictionally retaining the support in said storage position when the pan is moved, and means on the support for selective interfitting engagement with the upper end of the tube to hold the cake pan and tube in inverted position above the support when the latter is withdrawn from its storage position within the tube.

7. In combination, a cake pan having a central tube with open upper and lower ends, and a cake pan support having a body portion selectively and removably mounted in a storage position within the lower end of the tube, the body portion having a resiliently compressible section engaging the inner wall of the tube and frictionally retaining the support in said storage position when the pan is moved, and means on the support for selective interfitting engagement with the upper end of the tube to hold the cake pan and tube in inverted position above the support when the latter is withdrawn from its storage position within the tube.

8. In combination, a cake pan having a central tube, and a cake pan support movable selectively between a storage position within the tube and a supporting position at one end of the tube, the tube and support having interengaging means retaining the support within the tube in all positions of the pan when the support is in its selective storage position, and the tube and support having interengaging means supporting the pan and tube in inverted position above the support when the support is in its selective supporting position.

9. In combination, a cake pan and a support movable selectively between a storage position within the pan and a supporting position outside the pan, the pan and support having interengaging means retaining the support within the pan in all positions of the pan when the support is in its selective storage position, and the pan and support having interengaging means supporting the pan in inverted position above the support when the support is in its selective supporting position.

10. In combination, a cake pan and a support movable selectively between a storage position and a supporting position with respect to the pan, the pan and support having interengaging means securing the support to the pan in all positions of the pan when the support is in its selective storage position, and the pan and support having interengaging means supporting the pan in inverted position above the support when the support is in its selective supporting position.

WALTER VAN GUILDER.

References Cited in the file of this patent
UNITED STATES PATENTS

| Number | Name | Date |
| --- | --- | --- |
| 996,511 | Oltsch | June 27, 1911 |
| 1,456,238 | Ivancic | May 22, 1923 |
| 1,683,611 | Hager | Sept. 11, 1928 |
| 1,758,571 | Hager | May 13, 1930 |
| 1,992,950 | Horner et al. | Mar. 5, 1935 |
| 2,188,955 | Mattson | Feb. 6, 1940 |